(12) United States Patent
Levesque et al.

(10) Patent No.: US 10,466,793 B2
(45) Date of Patent: Nov. 5, 2019

(54) SYSTEMS AND METHODS FOR PROVIDING HAPTIC EFFECTS IN RESPONSE TO DEFORMATION OF A COVER FOR AN ELECTRONIC DEVICE

(71) Applicant: Immersion Corporation, San Jose, CA (US)

(72) Inventors: Vincent Levesque, Montreal (CA); Jamal Saboune, Montreal (CA); Juan Manuel Cruz-Hernandez, Montreal (CA); Abdelwahab Hamam, Montreal (CA); Vahid Khoshkava, Montreal (CA); Liwen Wu, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 16/386,500

(22) Filed: Apr. 17, 2019

(65) Prior Publication Data

US 2019/0243453 A1    Aug. 8, 2019

Related U.S. Application Data

(63) Continuation of application No. 16/023,727, filed on Jun. 29, 2018, now Pat. No. 10,310,614, which is a
(Continued)

(51) Int. Cl.
*G06F 3/01* (2006.01)
*G06F 3/0346* (2013.01)
*G06F 1/16* (2006.01)

(52) U.S. Cl.
CPC ............ *G06F 3/016* (2013.01); *G06F 1/1677* (2013.01); *G06F 1/1681* (2013.01);
(Continued)

(58) Field of Classification Search
CPC ...... G06F 3/016; G06F 3/0346; G06F 1/1677; G06F 1/1681; G06F 2200/1633; G06F 2200/1634
See application file for complete search history.

(56) References Cited

U.S. PATENT DOCUMENTS 6,297,838 B1    10/2001    Chang et al.
7,289,121 B1    10/2007    Balakrishnan et al.
(Continued)

OTHER PUBLICATIONS

Any copies of information that are not included with this Information Disclosure Statement can be found in U.S. Appl. No. 14/858,148 and U.S. Appl. No. 16/023,727.
(Continued)

*Primary Examiner* — Ryan A Lubit
(74) *Attorney, Agent, or Firm* — Medler Ferro Woodhouse & Mills PLLC (57) ABSTRACT

A system includes an electronic device that includes a display screen, a cover configured to cover the display screen, a sensor configured to sense an input gesture comprising deformation and/or movement of the cover relative to the electronic device, and a processor configured to determine an action for the electronic device to perform based on the input gesture, to determine a haptic effect to generate based on the input gesture and/or the action for the electronic device to perform, and to initiate the action. The system also includes a haptic output device configured to generate the haptic effect.

10 Claims, 8 Drawing Sheets

Related U.S. Application Data continuation of application No. 14/858,148, filed on Sep. 18, 2015, now Pat. No. 10,013,060.

(52) U.S. Cl.
CPC .... *G06F 3/0346* (2013.01); *G06F 2200/1633* (2013.01); *G06F 2200/1634* (2013.01)

(56) References Cited

U.S. PATENT DOCUMENTS

| | | |
|---|---|---|
| 7,443,380 B2 | 10/2008 | Nozawa |
| 2004/0008191 A1 | 1/2004 | Poupyrev et al. |
| 2006/0238494 A1 | 10/2006 | Narayanaswami et al. |
| 2006/0274036 A1 | 12/2006 | Hioki et al. |
| 2007/0247422 A1 | 10/2007 | Vertegaal et al. |
| 2008/0303782 A1 | 12/2008 | Grant et al. |
| 2009/0066663 A1 | 3/2009 | Chang et al. |
| 2009/0219247 A1 | 9/2009 | Watanabe et al. |
| 2010/0011291 A1 | 1/2010 | Nurmi et al. |
| 2010/0066685 A1 | 3/2010 | Cain et al. |
| 2010/0117975 A1 | 5/2010 | Cho |
| 2010/0141605 A1 | 6/2010 | Kang et al. |
| 2011/0021272 A1 | 1/2011 | Grant et al. |
| 2011/0057873 A1 | 3/2011 | Geissler et al. |
| 2011/0227822 A1 | 9/2011 | Shai |
| 2011/0261021 A1 | 10/2011 | Modarres et al. |
| 2012/0127088 A1 | 5/2012 | Pance et al. |
| 2012/0169609 A1 | 7/2012 | Britton |
| 2012/0188153 A1 | 7/2012 | Tziortzis et al. |
| 2012/0260220 A1 | 10/2012 | Griffin |
| 2012/0268412 A1 | 10/2012 | Cruz-Hernandez et al. |
| 2013/0009882 A1 | 1/2013 | Salmela |
| 2013/0050112 A1* | 2/2013 | Vanhelle ............... B60K 37/06 345/173 |
| 2013/0076614 A1* | 3/2013 | Ive ........................ G06F 1/1677 345/156 |
| 2013/0088339 A1 | 4/2013 | Lim et al. |
| 2013/0093660 A1 | 4/2013 | Hirsch et al. |
| 2013/0201115 A1 | 8/2013 | Heubel |
| 2013/0298039 A1 | 11/2013 | Mestre |
| 2013/0328825 A1* | 12/2013 | Brown ...................... G06F 3/01 345/174 |
| 2014/0043121 A1* | 2/2014 | Sartee ...................... G06F 1/16 335/219 |
| 2014/0083883 A1* | 3/2014 | Elias ..................... G06F 1/1626 206/320 |
| 2014/0085230 A1 | 3/2014 | Sato et al. |
| 2014/0268517 A1* | 9/2014 | Moon ....................... H05K 7/00 361/679.01 |
| 2015/0055308 A1 | 2/2015 | Lim et al. |
| 2015/0177838 A1* | 6/2015 | Bae ......................... G06F 3/016 345/173 |
| 2015/0316999 A1* | 11/2015 | Harms .................... G06F 3/023 345/169 |
| 2018/0321752 A1 | 11/2018 | Levesque et al. |

OTHER PUBLICATIONS

Extended European Search Report issued in European Application No. 16189157.7, dated Dec. 16, 2016.
Rendl et al., "FlexSense: A Transparent Self-Sensing Deformable Surface," Novel Hardware I, UIST'14, Oct. 5-8, 2014 pp. 129-138.

* cited by examiner

SYSTEMS AND METHODS FOR PROVIDING HAPTIC EFFECTS IN RESPONSE TO DEFORMATION OF A COVER FOR AN ELECTRONIC DEVICE

CROSS-REFERENCE PARAGRAPH

This application is a continuation of prior U.S. patent application Ser. No. 16/023,727, filed on Jun. 29, 2018, which is a continuation of prior U.S. patent application Ser. No. 14/858,148, now U.S. Pat. No. 10,013,060, filed on Sep. 18, 2015 and issued on Jul. 3, 2018, each of which is hereby incorporated by reference in their entirety for all purposes.

FIELD

The present invention is generally directed to systems and methods for providing haptic effects in response to deformation of a flexible cover for an electronic device.

BACKGROUND

Handheld electronic devices, such as smartphones, tablets, and e-book readers, are frequently used with covers that protect their screens and can be peeled off while in use. It is increasingly common for such devices to be able to detect the state of the cover and take an action based on the detected state. For example, many screen covers cause the display screen of the electronic device to turn off when the cover is closed. It is expected that covers for electronic devices will eventually be instrumented so that gestures, such as bending the cover or one of the corners of the cover, or peeling the cover off of the electronic device, can be detected and used for user input.

SUMMARY

It is desirable to improve a user's interactions with a cover of an electronic device by providing additional information to the user.

According to an aspect of the invention, there is provided a system that includes an electronic device comprising a display screen, a cover configured to cover the display screen, a sensor configured to sense an input gesture that includes deformation and/or movement of the cover relative to the electronic device, and a processor configured to determine an action for the electronic device to perform based on the input gesture, to determine a haptic effect to generate based on the input gesture and/or the action for the electronic device to perform, and to initiate the action. The system also includes a haptic output device configured to generate the haptic effect.

In an embodiment, the sensor is selected from the group consisting of: a bend sensor, a light sensor, a pressure sensor, a contact sensor, a potentiometer, an angular sensor, an angular velocity sensor, an accelerometer, and a magnetic sensor.

In an embodiment, the haptic output device includes an actuator configured to generate vibrations.

In an embodiment, the cover includes the actuator.

In an embodiment, the system includes a hinge that connects the cover to the electronic device, and the hinge includes the actuator.

In an embodiment, the haptic output device is embedded in the cover and includes an electro-rheological or magneto-rheological fluid to control a stiffness of the cover.

In an embodiment, the haptic output device includes an electrostatic friction device configured to generate a friction effect at a surface of the cover. In an embodiment, the surface of the cover faces the electronic device when the cover covers the display screen.

According to an aspect of the invention, there is provided a method that includes sensing an input gesture comprising deformation and/or movement of a cover for an electronic device relative to the electronic device with a sensor, determining an action for the electronic device to perform based on the input gesture with a processor, determining a haptic effect to generate based on the input gesture and/or the action for the electronic device to perform with the processor, initiating the action for the electronic device to perform with the processor, and generating the haptic effect with a haptic output device during and/or after the sensing of the input gesture.

In an embodiment, the haptic effect is generated during the sensing of the input gesture.

In an embodiment, the haptic effect is generated after the sensing of the input gesture.

In an embodiment, the haptic effect is generated after the action is completed to confirm completion of the action.

In an embodiment, the haptic effect includes resisting peeling of the cover away from the electronic device.

In an embodiment, the haptic effect includes creating a texture when the cover is peeled away from the electronic device.

In an embodiment, the haptic effect includes changing a stiffness of the cover.

In an embodiment, the haptic effect includes a tactile sensation on a surface of the cover facing the electronic device when the cover covers the electronic device.

In an embodiment, the haptic effect includes a tactile sensation on a top surface of the cover opposite a surface facing the electronic device when the cover covers the electronic device.

In an embodiment, the method includes determining whether the action can be initiated, and the haptic effect includes resisting the deformation when the action cannot be initiated.

In an embodiment, the haptic effect includes actuating at least one hinge located along at least one crease in the cover to fold the cover at the crease.

In an embodiment, the haptic effect includes restricting movement of the cover to a predetermined angle relative to the electronic device based on the action.

According to an aspect of the invention, there is provided a cover for an electronic device. The cover includes a sensor configured to sense an input gesture comprising deformation and/or movement of the cover relative to the electronic device, and a haptic output device configured to generate a haptic effect based on the input gesture.

In an embodiment, the cover includes a processor configured to determine an action for the electronic device to perform based on the input gesture, to determine the haptic effect to generate based on the input gesture and/or the action for the electronic device to perform, and to initiate the action.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The components of the following Figures are illustrated to emphasize the general principles of the present disclosure and are not necessarily drawn to scale. Reference characters designating corresponding components are repeated as necessary throughout the Figures for the sake of consistency and clarity.

DETAILED DESCRIPTION

Figure 1:
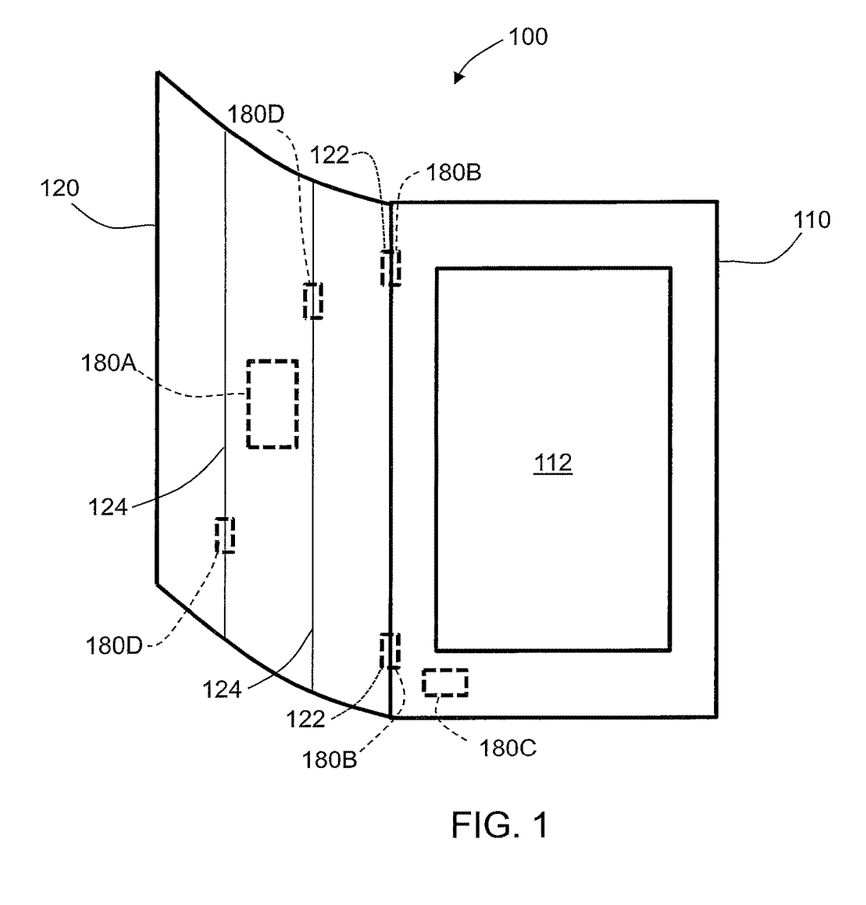
FIG. 1 illustrates a system that includes an electronic device and a cover in accordance with embodiments of the invention.

FIG. 1 is a schematic illustration of a system 100 in accordance with embodiments of the invention. The system 100 includes an electronic device 110 that includes a display screen 112, and a cover 120 configured to be coupled, connected, or attached to the electronic device 110 along one edge thereof. The electronic device 110 may be a tablet, a smartphone, an e-reader, a calculator or any other electronic device that may be used with a connectable or attachable cover. The cover 120 is configured to allow access to the electronic device 110 when in an open position, as illustrated in FIG. 1, and cover the display screen 112 of the electronic device 110 when in a closed position (not shown).

The cover 120 may be configured to protect the electronic device 110 when in the closed position. In an embodiment, the cover 120 may be configured to receive the electronic device 110 so when the electronic device 110 sits inside the cover 120 and the cover 120 is in the closed position, the cover 120 substantially or completely surrounds the electronic device 110. In an embodiment, the cover 120 may include at least one hinge 122 that is configured to releasably connect or attach the cover 120 to the electronic device 110 via a magnet or other mechanism that allows the cover 120 to be releasably connected to the electronic device 110. The cover 120 may be transparent or partially transparent such that at least a portion of the cover 120 allows the display screen 112 to display images to the user when the cover 120 is in a closed position. In an embodiment, the cover 120 may be a transparent or opaque cover that is used as an interactive layer for the user to provide input gestures to the electronic device 110. In an embodiment, the cover 120 is flexible so that the user may bend, fold, twist, roll or otherwise deform the cover 120 and a manner that the cover 120 may be used as an interactive interface for applications running on the underlying electronic device 110.

Upon detection of an input gesture in the form of deformation of the cover 120, the electronic device 110 may then perform an action based on the input gesture that has been detected, such as turning on the display screen 112 or changing the information displayed on the display screen 112. The action to be performed may be dependent on the context, and may be programmed as part of an application or the operating system of the electronic device 110.

Figure 2:
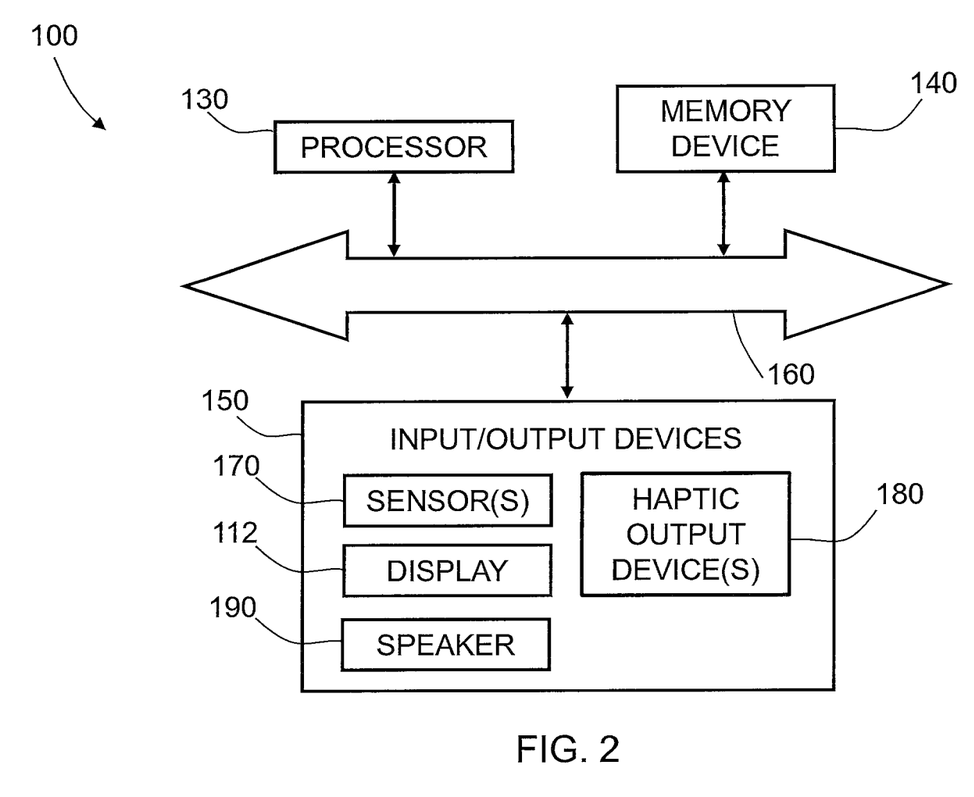
FIG. 2 schematically illustrates the system of FIG. 1.

As schematically illustrated in FIG. 2, the system 100 includes a processor 130, a memory device 140, and input/output devices 150, which may be interconnected via a bus and/or communications network 160. In an embodiment, the input/output devices 150 may include at least one sensor 170, at least one haptic output device 180, the display 112 illustrated in FIG. 1, a speaker 190 and/or other input/output devices.

The processor 130 may be a general-purpose or specific-purpose processor or microcontroller for managing or controlling the operations and functions of the system 100. For example, the processor 130 may be specifically designed as an application-specific integrated circuit ("ASIC") to control output signals to a user of the input/output devices 150 to provide haptic feedback or effects to the user. The processor 130 may be configured to decide, based on predefined factors, what haptic feedback or effects are to be generated based on a haptic signal received or determined by the processor 130, the order in which the haptic effects are generated, and the magnitude, frequency, duration, and/or other parameters of the haptic effects. The processor 130 may also be configured to provide streaming commands that can be used to drive the haptic output device 180 for providing a particular haptic effect. The processor 130 may be part of the electronic device 110 or the cover 120. In some embodiments, more than one processor 130 may be included in the system 100, with each processor 130 configured to perform certain functions within the system 100. For example, in an embodiment, a first processor may be part of the electronic device 110 and a second processor may be part of the cover 120. An embodiment of the processor 130 is described in further detail below.

The memory device 140 may include one or more internally fixed storage units, removable storage units, and/or remotely accessible storage units. The various storage units may include any combination of volatile memory and non-volatile memory. The storage units may be configured to store any combination of information, data, instructions, software code, etc. More particularly, the storage units may include haptic effect profiles, instructions for how the haptic output device 180 of the input/output devices 150 is to be driven, and/or other information for generating haptic feedback or effects. The memory device 140 may be part of the electronic device 110 or the cover 120.

The bus and/or communications network 160 may be configured to allow signal communication between the various components of the system 100 and also to access information from remote computers or servers through another communications network. The communications network may include one or more of a wireless communications network, an Internet, a personal area network ("PAN"), a local area network ("LAN"), a metropolitan area network ("MAN"), a wide area network ("WAN"), etc. The communications network may include local radio frequencies, cellular (GPRS, CDMA, GSM, CDPD, 2.5G, 3G, 4G LTE, etc.), Ultra-WideBand ("UWB"), WiMax, ZigBee, and/or other ad-hoc/mesh wireless network technologies, etc.

The sensor 170 is configured to detect the deformation and/or movement of the cover 120 with respect to the electronic device 110. The sensor 170 may be part of the cover 120, the electronic device 110, or both the cover 120 and the electronic device 110. The deformations may include bending, folding, rolling, or twisting the cover 120, or peeling the cover 120 off of the electronic device 110 from an edge or corner. The movements may include sliding the cover 120 relative to the electronic device 110, or separating the cover 120 from the electronic device 110. The sensor 170 may include: a bend sensor (e.g., FSR, strain gauge, fiber optic sensor), a light sensor, a pressure sensor, a contact sensor, a mechanical switch that may detect when the cover 120 is moved off the electronic device 110, a potentiometer or other angular sensor in the hinge 122, an accelerometer, a gyroscope or other angular velocity sensor, a magnetic sensor (e.g., magnetic markers on the cover 120), etc.

Additional sensors 170 may be included in the system 100. For example, in an embodiment, the electronic device 110 may include a proximity sensor configured to sense the location of a user input element, such as the user's hand or a part of the user's hand, such as a finger, or a stylus, to the display screen 112, which may be part of a touch sensitive device. In an embodiment, the cover 120 may include a touch sensitive device configured to sense touch inputs provided by the user on the cover 120 so that the user may interact with the electronic device without opening the cover 120 or taking the cover 120 off of the electronic device 110. In an embodiment, the electronic device 110 and/or the cover 120 may include a pressure sensor configured to measure the pressure applied to a touch location at the touch sensitive device. In an embodiment, the system 100 may include a temperature, humidity, and/or atmospheric pressure sensor configured to measure environmental conditions. In an embodiment, the system 100 may include a physiological sensor configured to capture a user's physiological signals, such as heart rate, etc. In an embodiment, the system 100 may include image sensors and/or a camera configured to capture a user's facial expressions and associated biometric information.

The haptic output device 180 is configured to provide haptic feedback to the user of the system 100 and may be part of the cover 120 or the electronic device 110. In an embodiment, the cover 120 and the electronic device 110 may each include at least one haptic output device 180. The haptic output device 180 may be powered by an energy source provided on the electronic device 110 and/or the cover 120.

The haptic feedback provided by the haptic output device 180 may be created with any of the methods of creating haptic effects, such as vibration, deformation, kinesthetic sensations, electrostatic or ultrasonic friction, etc. In an embodiment, the haptic output device 180 may include an actuator, for example, an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric materials, electro-active polymers or shape memory alloys, a macro-composite fiber actuator, an electro-static actuator, an electro-tactile actuator, and/or another type of actuator that provides a physical feedback such as vibrotactile feedback. A suitable haptic output device 180 may be selected based on its size and/or output. For example, piezoelectric materials and/or electro-active polymers, as represented by 180A in FIG. 1, may be more suitable to be embedded in a flexible cover 120 due to their thinness. Other actuators, such as ERM's and LRA's may be embedded in larger components of the system 100, such as in the hinges 122 of the cover 120, as represented by 180B in FIG. 1, or in the body of the electronic device 110, as represented by 180C in FIG. 1, but desirably placed in such a way that haptic effects may be felt through the cover 120. By providing haptic output devices on the cover 120 and on the electronic device 110, richer, more distinct haptic feedback may be generated to provide the user with additional information as compared to having a haptic output device only on the electronic device 110, for example.

The haptic output device 180 may include non-mechanical or non-vibratory devices such as those that use electrostatic friction ("ESF"), ultrasonic friction ("USF"), or those that induce acoustic radiation pressure with an ultrasonic haptic transducer, or those that use a haptic substrate and a flexible or deformable surface, or those that provide thermal effects, or those that provide projected haptic output such as a puff of air using an air jet, and so on. Multiple haptic output devices 180 may be used to generate different haptic effects, which may be used to create a wide range of effects such as deformations, vibrations, etc. For example, pulses of vibration may give the illusion that a flexible surface is more flexible than it really is, that it is made of a specific material, such as wood or plastic, or that it is bending at discrete points (i.e. detents). Additional examples of haptic effects that may be generated by the haptic output device 180 are discussed below.

Figure 3:
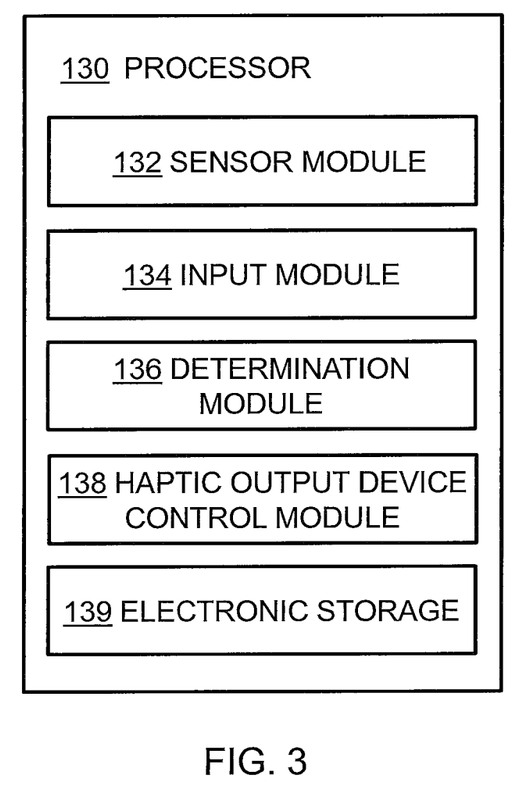
FIG. 3 schematically illustrates a processor of the system of FIG. 2.

FIG. 3 illustrates an embodiment of the processor 130 in more detail. The processor 130 may be configured to execute one or more computer program modules. The one or more computer program modules may include one or more of a sensor module 132, an input module 134, a determination module 136, a haptic output device control module 138, and/or other modules. The processor 130 may also include electronic storage 139, which may be the same as the memory device 140 or in addition to the memory device 140. The processor 130 may be configured to execute the modules 132, 134, 136 and/or 138 by software, hardware, firmware, some combination of software, hardware, and/or firmware, and/or other mechanisms for configuring processing capabilities on processor 130.

It should be appreciated that although modules 132, 134, 136 and 138 are illustrated in FIG. 3 as being co-located within a single processing unit, in embodiments in which the system includes multiple processors, one or more of modules 132, 134, 136 and/or 138 may be located remotely from the other modules. The description of the functionality provided by the different modules 132, 134, 136 and/or 138 described below is for illustrative purposes, and is not intended to be limiting, as any of the modules 132, 134, 136 and/or 138 may provide more or less functionality than is described. For example, one or more of the modules 132, 134, 136 and/or 138 may be eliminated, and some or all of its functionality may be provided by other ones of the modules 132, 134, 136 and/or 138. As another example, the processor 130 may be configured to execute one or more additional modules that may perform some or all of the functionality attributed below to one of the modules 132, 134, 136 and/or 138.

The sensor module 132 is configured to receive a signal from the sensor 170 that is generated when the sensor 170 detects deformation of the cover 120, which may be used as an input gesture by the user. The sensor module 132 is programmed to analyze raw sensor data received from the sensor 170 and determine whether a deformation of the cover 120 has occurred above a predetermined threshold to indicate an input gesture by the user. For example, the sensor module 132 may determine that a single corner of the cover 120 has been bent based on the readings from one or more sensors 170 on the cover 120 by an amount that indicates an input gesture has been made. The sensor module 132 may also determine that the cover 120 has been peeled off the display screen 112 by an amount that exposes pixels starting at a certain column on the display screen 112, which correlates to a particular input gesture. Upon determining that the sensed deformation of the cover 120 is above a predetermined threshold that indicates an input gesture is being made by the user, the sensor module 132 may output a signal to the input module 134 for further processing.

The input module 134 is configured or programmed to receive a signal from the sensor module 132 that is generated when the sensor module 132 detects a deformation of the cover 120 that is above a predetermined threshold indicating the user is making an input gesture. For example, the user may indicate an input by bending the cover 120 at one corner thereof, or by folding a part of the cover 120 away from the electronic device 110, or by twisting a part of the cover 120, or by a sequence of bending, folding and/or twisting parts of the cover 120. The input module 134 may be programmed with a look-up table that provides a correlation of the signals received from the sensor module 132 to predefined input gestures. After the input gesture has been identified, the input module 134 is configured or programmed to send a signal to the determination module 136 for further processing.

The determination module 136 is configured or programmed to determine what type of action is to be taken by the system 100 according to the signal received from the input module 134, and what type of haptic feedback is to be generated by the haptic output device 180. The determination module 136 may be programmed with a library of input gesture and function information that is available to the system 100 and corresponding haptic effect, if any, so that the determination module 136 may determine a corresponding output. In addition to sending a signal to command a particular action to be taken by the electronic device 110, the determination module 136 may also output a signal to the haptic output device control module 138 so that a suitable haptic effect may be provided to the user. For example, an input gesture involving bending a corner of the cover 120 may correspond to the electronic device 110 retrieving e-mail from a server, and the haptic effect may indicate how many new e-mails have been retrieved from the server.

The haptic output device control module 138 is configured or programmed to determine a haptic control signal to output to the haptic output device 180, based on the signal generated by the determination module 136. Determining the haptic control signal may include determining one or more parameters that include an amplitude, frequency, duration, etc., of the haptic feedback that will be generated by the haptic output device 180 to provide the desired effect to the user, based on all inputs to the system 100.

As indicated above, the haptic output device 180 may be used to produce haptic effects while the user is performing the input gesture or after the input gesture has been completed. The haptic feedback may, for example, provide information about the ongoing input gesture and its effect. The haptic feedback may also be used to confirm that an input gesture has been accepted.

In an embodiment, the haptic feedback may be generated while the user performs an input gesture with the cover 120. For example, in an embodiment, the cover 120 may be configured to resist peeling or produce a realistic texture when peeled off of the electronic device 110. This may, for example, replicate the feel of tape, static attraction, the creaking of a hinge, or the texture of a material such as wood being bent. In an embodiment, the cover 120 may be configured to change stiffness to replicate water, sand, or other materials. In an embodiment, the cover 120 may be configured to produce tactile sensations on one or both of its surfaces, for example, using electrostatic frictional effect.

The haptic feedback may be used to confirm which of many possible input gestures has been provided by the user. A different action may, for example, be triggered by pulling on the cover 120 at different locations along its edge, and a haptic texture may be used to indicate which of these actions has been selected.

The haptic output device 180 may also be used to indicate or restrict which input gestures can be performed. For example, in an embodiment, the cover 120 may be configured to resist an input gesture, such as peeling, when the associated function is not available. The cover 120 may also be configured to resist peeling at specific locations, such as when specific content is about to be revealed.

In an embodiment, the cover 120 may be configured to allow folding along specific creases 124 with actuated hinges 180D illustrated in FIG. 1. The folding may be restricted based on the application, e.g. allowing only 45-degree folds to be made. In an embodiment, the cover 120 may be forced to snap against the screen at a specific angle based on the application. In an embodiment, the cover 120 may be configured to deform in a visible manner to indicate available input gestures, such as bending a corner.

The haptic feedback may be delivered through a variety of haptic output devices, some of which may make use of the unique properties of the cover 120, such as the presence of the hinges 122. The cover 120 may be used to deliver haptic feedback while located on the front or the back of the electronic device 110. A third-party cover in accordance with embodiments of the invention may provide the system 100 with haptic feedback even though the electronic device 110 is not configured to generate haptic feedback. Haptic feedback may be applied through the hinges 122 of the cover 120, either where the cover 120 couples to the electronic device 110, or in the folds 124 of the cover 120.

Figure 4A:
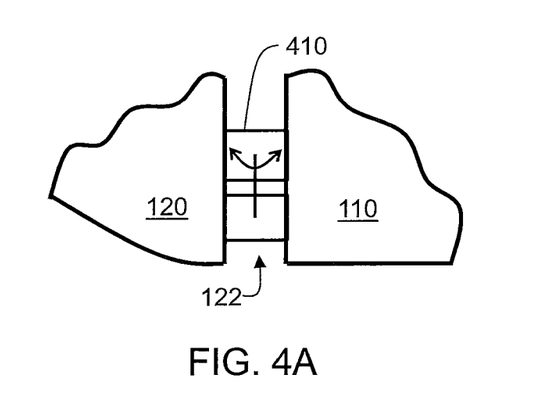
FIG. 4A illustrates an embodiment of a hinge of the cover of FIG. 1.
Figure 4B:
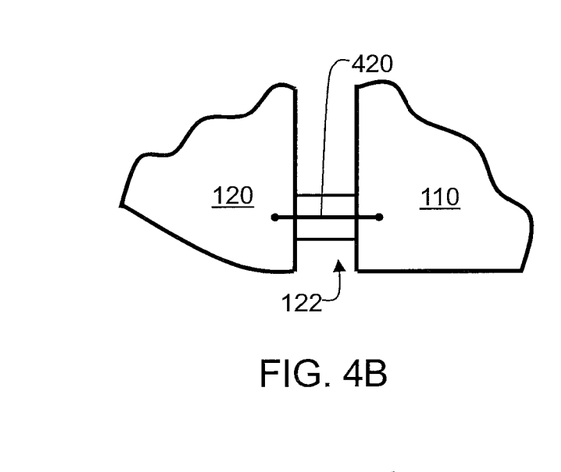
FIG. 4B illustrates an embodiment of the hinge of the cover of FIG. 1.
Figure 4C:
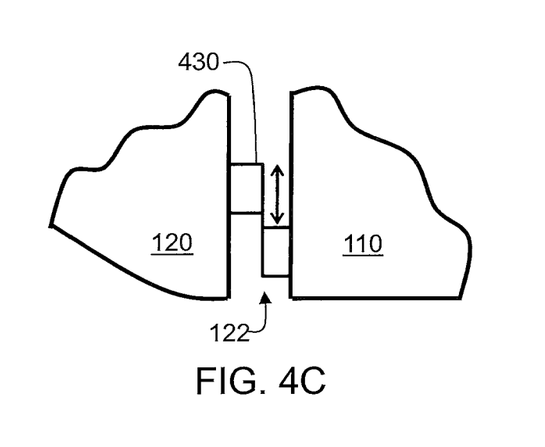
FIG. 4C illustrates an embodiment of the hinge of the cover of FIG. 1.
Figure 5:
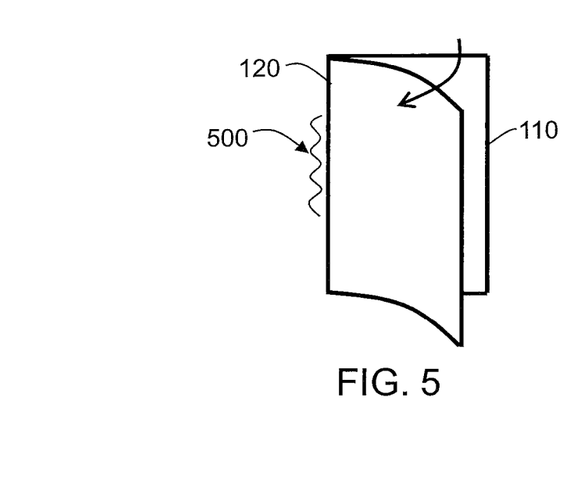
FIG. 5 illustrates an embodiment of the system of FIG. 1.

In an embodiment illustrated in FIG. 4A, a DC motor 410 may, for example, be placed at the hinge 122 and control movement of the hinge 122 and, therefore, the cover 120 relative to the electronic device 110. In an embodiment illustrated in FIG. 4B, one or more wires 420 may similarly be used to pull the two sides of the hinge 122 and make the hinge 122 move so that the cover 120 moves relative to the electronic device 110. In an embodiment, a DC motor may be used to shorten the wire(s) 420. In an embodiment, the wire(s) 420 may be made from a shape memory alloy or similar material and configured to contract to pull the two sides of the hinge 122 together. In an embodiment, the hinge 122 may be used to move the cover 120 laterally relative to the electronic device 110, instead of making the cover 120 rotate relative to the electronic device 110. For example, as schematically illustrated in FIG. 4C, a DC motor or voice coil 430 may, for example, be activated within the hinge 122 to push the cover 120 laterally relative to the electronic device 110, as indicated by the double arrow. By having a haptic output device in any of the forms illustrated in FIGS. 4A-4C, the cover 120 may produce a variety of haptic effects as it rotates on the hinge 122 relative to the electronic device 110 or moves laterally on the hinge 122 relative to the electronic device 110. Such haptic effects, generally denoted by 500 in FIG. 5, may include resistance, textures, detents, etc. In an embodiment, the haptic effects 500 may be mapped to different experiences, such as opening a creaking door as the cover 120 is pulled away from the electronic device 110 in the direction of the arrow.

Figure 6:
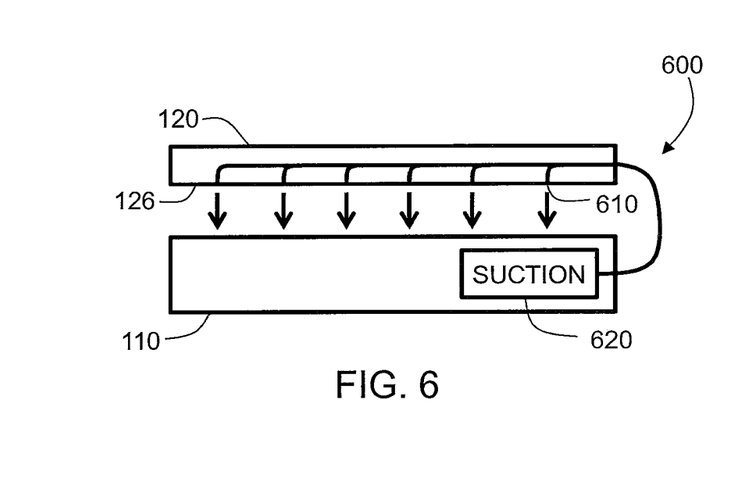
FIG. 6 illustrates an embodiment of the system of FIG. 1.
Figure 7:
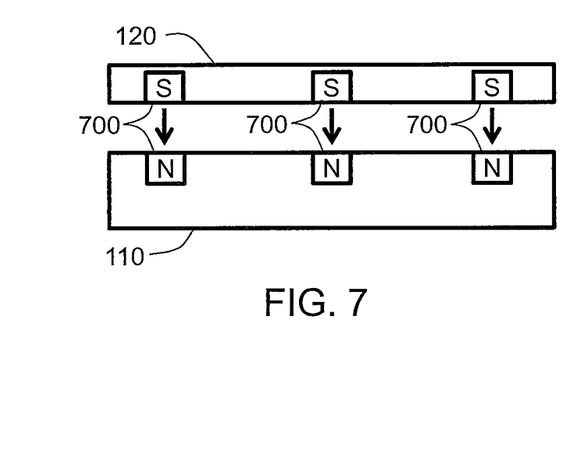
FIG. 7 illustrates an embodiment of the system of FIG. 1.

Different mechanisms may be used to produce an attraction or repulsion force between the cover 120 and the electronic device 110, and affect how the cover 120 reacts to being pulled open. As illustrated in FIG. 6, in an embodiment, a pneumatic system 600 may, for example, open microvalves 610 on an inner surface 126 of the cover 120 and use a pump 620 that creates a suction force through the microvalves 610 against the electronic device 110. In an embodiment, the pump 620 may be used to push a gas, such as air, through the microvalves 610 to create a repulsion force between the cover 120 and the electronic device 110. In an embodiment, an electric field may similarly be created on the electronic device 110 or the inner part of the cover 120 to create an electrostatic attraction or repulsion force between the electronic device 110 and the cover 120. In an embodiment schematically illustrated in FIG. 7, electromagnets 700 may be embedded in the cover 120 and/or the electronic device 110 and may cause an attraction or repulsion force between the cover 120 and the electronic device 110, depending on the polarity of the electromagnets 700. In an embodiment, microfluidics may also be used to create small dimples on the inner surface of the cover 120 or on the electronic device 110 in order to break an attraction force, e.g. due to a magnetic snapping mechanism or the natural electrostatic forces.

Figure 8A:
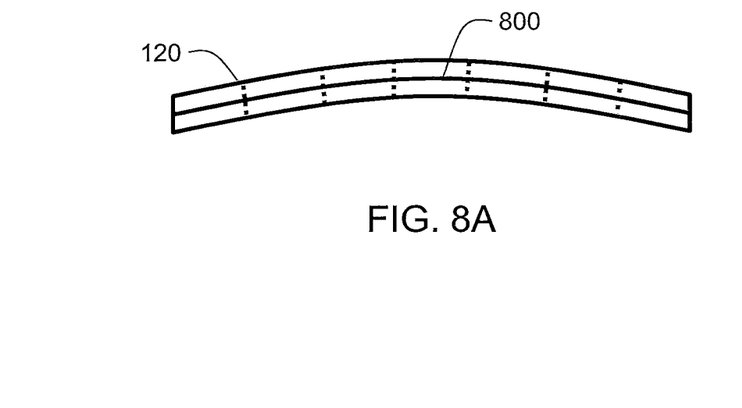
FIG. 8A illustrates an embodiment of the cover of FIG. 1 in a flexible condition.
Figure 8B:
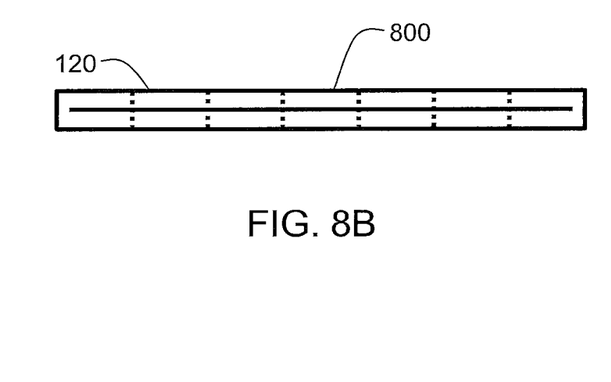
FIG. 8B illustrates an embodiment of the cover of FIG. 8A in a rigid condition.

In embodiments of the invention, the haptic effect may be in the form of changing a stiffness of the cover 120, as schematically illustrated in FIGS. 8A and 8B. In an embodiment, electro-rheological or magneto-rheological fluids may be embedded in the cover 120 to control its stiffness. In an embodiment, particle jamming may be used to stiffen the cover 120 on command. In an embodiment, wires 800 made from shape memory alloys may be stiffened or wires actuated with a DC motor may be pulled in order to make the cover 120 more rigid. FIG. 8A illustrates the cover 120 in a flexible condition, and FIG. 8B illustrated the cover 120 in a stiff or rigid condition.

Figure 9:
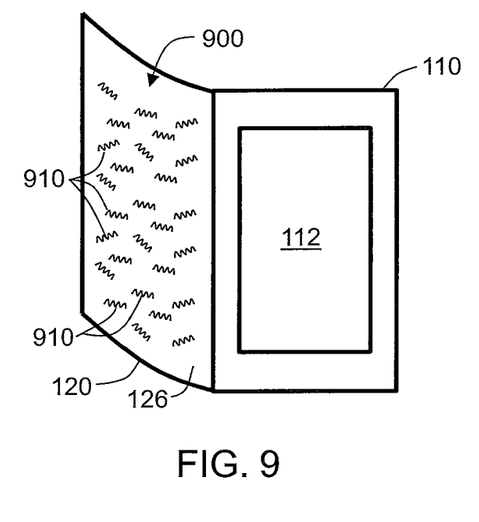
FIG. 9 illustrates an embodiment of the system of FIG. 9.

In an embodiment illustrated in FIG. 9, the cover 120 may have an electrostatic friction device 900 on its inner surface 126 that faces the electronic device 110 when the cover 120 is in the closed position and/or its outer surface. The electrostatic frictional force effects, represented by 910 in FIG. 9 and generated by the electrostatic friction device 900 may be felt as the cover 120 is manipulated, such as when opening the cover 120. The electrostatic frictional force feedback may also represent the state of the electronic device 110 or content of the display screen 112 while the cover 120 is closed. The electrostatic frictional force effects 910 may also be used to affect the friction properties of the cover 120, and therefore how easy the cover 120 is to manipulate.

Figure 10A:
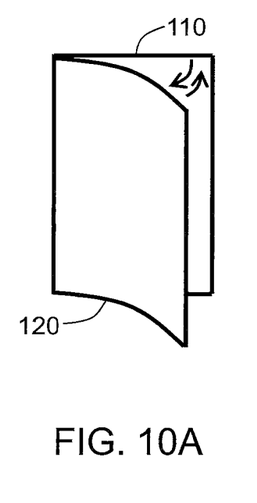
FIG. 10A illustrates an embodiment of the system of FIG. 1 with a first part of an input gesture being performed.
Figure 10B:
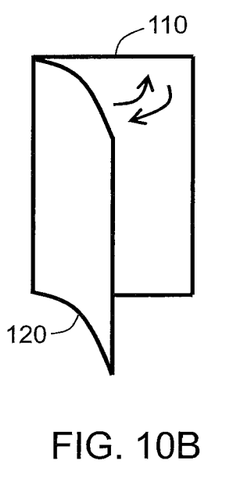
FIG. 10B illustrates an embodiment of the system of FIG. 10A with a second part of the input gesture begin performed.
Figure 10C:
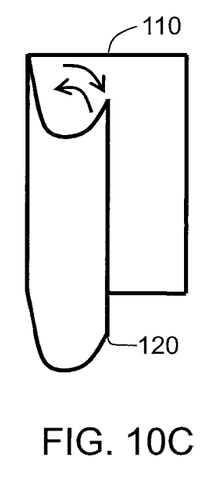
FIG. 10C illustrates an embodiment of the system of FIG. 10B with a third part of the input gesture being performed.

In an implementation of embodiments of the invention illustrated in FIGS. 10A, 10B and 10C, the electronic device 110 may be a phone or a tablet, and the user may unlock his/her phone by rolling off the cover 120 in a manner that only the user knows. As the user completes the different steps of the input gesture, represented by arrows in FIGS. 10A, 10B and 10C, the user may receive haptic feedback that confirms the steps of the input gesture.

Figure 11:
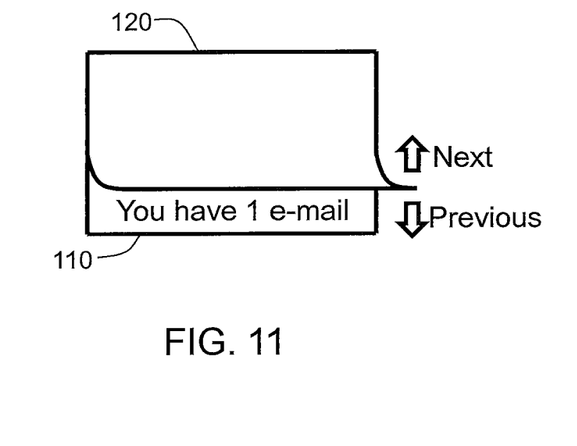
FIG. 11 illustrates an embodiment of the system of FIG. 1.

In an implementation of embodiments of the invention illustrated in FIG. 11, a user may fold or slightly unroll the cover 120 coupled to his/her electronic device 110, which may be a tablet, to partially reveal the screen of the tablet and see incoming notifications in a discrete, private manner. Sensor(s) in the cover 120 may allow the cover 120 to be used for input when in this mode, so that the user may bend or roll the cover 120 to scroll through the notifications and receive confirmation haptic feedback to indicate that a "peeking mode" has been activated and to confirm each input.

In an implementation of embodiments of the invention, a user may use an e-book that has a flexible overlay. The user may bend the corners of the overlay slightly to flip to the next page of the e-book. The user may bend and hold to flip through multiple pages. As the user does so, the user may feel realistic haptic effects that remind him/her of manipulating a real book.

In an implementation of embodiments of the invention, a user may use a drawing application on his/her desktop computer. The monitor of the computer may have an overlay that allows the user to peek at the image he/she is working on before and after a certain operation is applied. Haptic effects may be generated to remind the user of the static feel of a sheet of plastic acetate. When the operation cannot be previewed, the overlay may resist peeling to clearly indicate that the option is not available.

Figure 12:
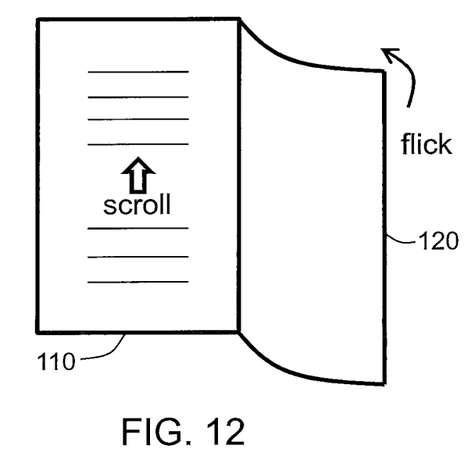
FIG. 12 illustrates an embodiment of the system of FIG. 1.

In an embodiment illustrated in FIG. 12, deformation of the cover 120 may be used by the user to control aspects of the electronic device 110. For example, as the user flicks a corner of the cover 120, the display screen 112 of the electronic device 100 may scroll the contents being displayed. Different input gestures, such as bending different parts of the cover 120 or twisting the cover 120, for example, may be used to control different functions of the electronic device 110, which may provide a flexible input on an otherwise rigid electronic device 110.

Figure 13:
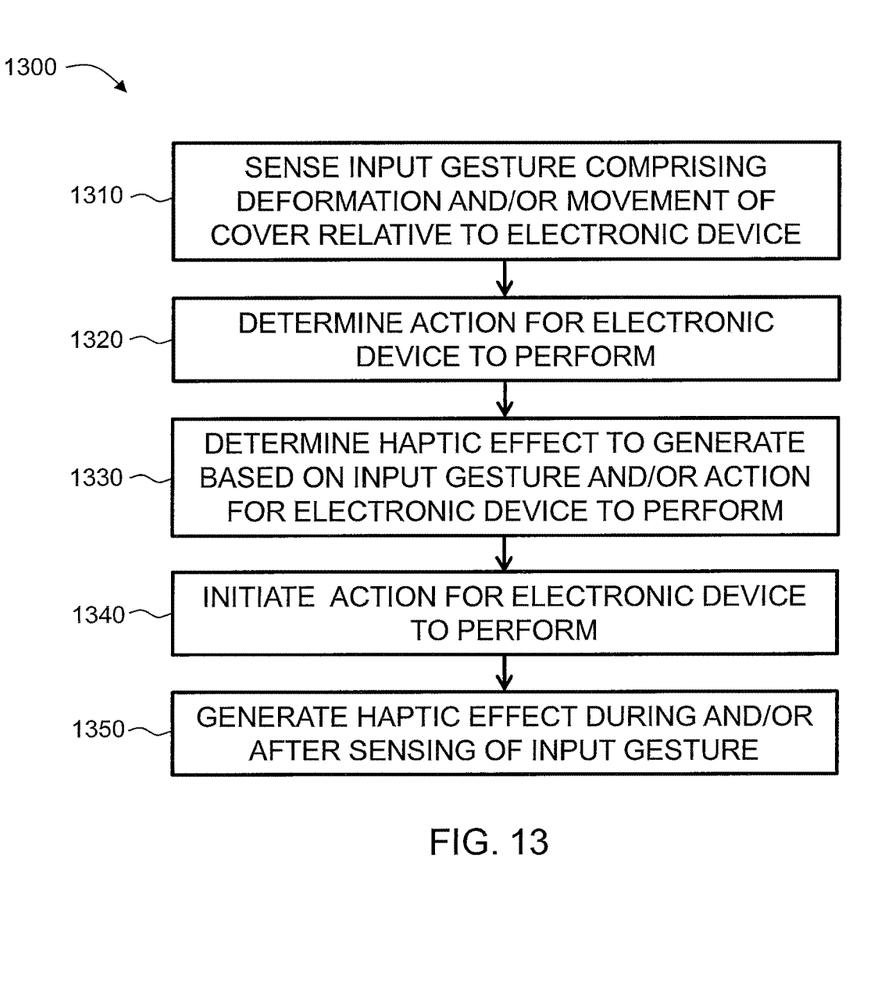
FIG. 13 schematically illustrates a method in accordance with embodiments of the invention.

FIG. 13 illustrates a method 1300 in accordance with embodiments of the invention. At 1310, an input gesture that includes deformation and/or movement of the cover 120 relative to the electronic device 110 is sensed or detected by the sensor 170 described above. At 1320, an action for the electronic device 110 to perform is determined, based on the input gesture, by the processor 130 described above. At 1330, a haptic effect to be generated based on the input gesture and/or the action for the electronic device 110 to perform is determined by the processor 130. At 1340, the action for the electronic device 110 to perform is initiated by the processor 130. At 1350, the haptic effect is generated with the haptic output device 180 during and/or after the sensing of the input gesture. The method 1300 may be repeated.

The embodiments described herein represent a number of possible implementations and examples and are not intended to necessarily limit the present disclosure to any specific embodiments. Various modifications can be made to these embodiments as would be understood by one of ordinary skill in the art. Any such modifications are intended to be included within the spirit and scope of the present disclosure and protected by the following claims.

What is claimed is:

1. A system comprising:
an electronic device including a display screen;
a cover configured to cover the display screen;
a sensor configured to sense an input gesture comprising movement of the cover;
at least one electromagnetic embedded in the cover; and
a processor configured to:
energize the at least one electromagnet to cause an attraction force between the cover and the electronic device to resist opening the cover in response to the input gesture while the electronic device is in a first application state; and
energize the at least one electromagnet to cause a repulsion force between the cover and the electronic device to resist opening the cover in response to the input gesture while the electronic device is in a second application state.

2. The system of claim 1, wherein the processor is further configured to:
determine an action for the electronic device to perform based on the input gesture, and
initiate the action.

3. The system of claim 1, further comprising:
a haptic output device configured to generate a haptic effect,
wherein the cover is a flexible cover configured to receive the input gesture, wherein the input gesture further comprises deformation of the cover, and
wherein the processor is further configured to:
determine an action for the electronic device to perform based on the input gesture,
determine a haptic effect to be performed by the haptic output device, the haptic effect including a change in a stiffness of the flexible cover based on at least one of the input gesture and the action for the electronic device to perform, and
initiate the action.

4. A system comprising:
an electronic device including a display screen;
a cover configured to cover the display screen;
a sensor configured to sense an input gesture comprising movement of the cover;
at least one electromagnetic embedded in the electronic device; and
a processor configured to:
energize the at least one electromagnet to cause an attraction force between the cover and the electronic device to resist opening the cover in response to the input gesture while the electronic device is in a first application state; and
energize the at least one electromagnet to cause a repulsion force between the cover and the electronic device to resist opening the cover in response to the input gesture while the electronic device is in a second application state.

5. The system of claim 4, wherein the processor is further configured to:
determine an action for the electronic device to perform based on the input gesture, and
initiate the action.

6. The system of claim 4, further comprising:
a haptic output device configured to generate a haptic effect,
wherein the cover is a flexible cover configured to receive the input gesture, wherein the input gesture further comprises deformation of the cover, and
wherein the processor is further configured to:
determine an action for the electronic device to perform based on the input gesture,
determine a haptic effect to be performed by the haptic output device, the haptic effect including a change in a stiffness of the flexible cover based on at least one of the input gesture and the action for the electronic device to perform, and
initiate the action.

7. A method comprising:
sensing, by a sensor, an input gesture made with a cover of an electronic display device, the input gesture including movement of the cover;
energizing at least one electromagnet embedded in the cover or the electronic device to cause an attraction force between the cover and the electronic device to resist opening the cover in response to the input gesture while the electronic device is in a first application state; and
energizing the at least one electromagnet to cause a repulsion force between the cover and the electronic device to resist opening the cover in response to the input gesture while the electronic device is in a second application state.

8. The method of claim 7, further comprising:
determining, by a processor, an action for the electronic device to perform based on the input gesture; and
initiating, by the processor, the action for the electronic device to perform.

9. The method of claim 8, wherein sensing the input gesture further comprises sensing that the cover is deformed to display a portion of a screen of the electronic device, and
wherein determining the action for the electronic device to perform further includes displaying incoming notifications in response to determining that the cover is deformed.

10. The method of claim 8, wherein sensing the input gesture further comprises sensing a plurality of steps of the input gesture, each step including at least a corresponding deformation, and
wherein determining the action for the electronic device to perform further includes unlocking the electronic device in response to sensing the plurality of steps.

* * * * *